(12) United States Patent
Mehta

(10) Patent No.: US 8,537,829 B2
(45) Date of Patent: Sep. 17, 2013

(54) PAGING CONTROL IN COMMUNICATION NETWORKS

(75) Inventor: Pratik Mehta, Pune (IN)

(73) Assignee: Cisco Technology, Inc., San Jose, CA (US)

(*) Notice: Subject to any disclaimer, the term of this patent is extended or adjusted under 35 U.S.C. 154(b) by 355 days.

(21) Appl. No.: 12/882,402

(22) Filed: Sep. 15, 2010

(65) Prior Publication Data

US 2012/0063464 A1   Mar. 15, 2012

(51) Int. Cl.
*H04L 12/28* (2006.01)
*H04L 12/56* (2011.01)
*H04L 12/54* (2013.01)

(52) U.S. Cl.
CPC .................. *H04L 12/5695* (2013.01)
USPC ........ 370/395.2; 370/229; 370/235; 370/236; 370/351; 370/395.1; 370/395.21; 370/401

(58) Field of Classification Search
None
See application file for complete search history.

(56) References Cited

U.S. PATENT DOCUMENTS

| | | | |
|---|---|---|---|
| 5,153,902 A | 10/1992 | Buhl et al. | |
| 5,940,762 A | 8/1999 | Lee et al. | |
| 5,995,832 A | 11/1999 | Mallinckrodt | |
| 6,314,174 B1 * | 11/2001 | Furutono | 379/221.06 |
| 6,438,383 B1 | 8/2002 | Hall et al. | |
| 6,553,217 B1 | 4/2003 | Kundorf et al. | |
| 6,748,247 B1 | 6/2004 | Ramakrishnan et al. | |
| 6,781,972 B1 | 8/2004 | Anderlind et al. | |
| 7,154,868 B1 | 12/2006 | Sharma et al. | |
| 7,289,480 B2 | 10/2007 | Lundstrom et al. | |
| 7,489,936 B1 | 2/2009 | Liu | |
| 2002/0057649 A1 | 5/2002 | Kinnunen | |
| 2002/0105970 A1 | 8/2002 | Shvodian | |
| 2002/0194506 A1 * | 12/2002 | Wiley et al. | 713/201 |
| 2003/0026211 A1 | 2/2003 | Xu et al. | |
| 2003/0221016 A1 | 11/2003 | Jouppi et al. | |
| 2003/0235171 A1 | 12/2003 | Lundstrom et al. | |
| 2004/0022212 A1 | 2/2004 | Chowdhury et al. | |
| 2004/0022258 A1 | 2/2004 | Tsukada et al. | |
| 2004/0109426 A1 | 6/2004 | Veerepalli et al. | |
| 2004/0120283 A1 | 6/2004 | Rezaiifar et al. | |
| 2004/0151155 A1 | 8/2004 | Jouppi | |

(Continued)

OTHER PUBLICATIONS

International Search Report and Written Opinion issued for PCT/US09/64979, mailed Feb. 25, 2010 (7 pages).

(Continued)

*Primary Examiner* — Ayaz Sheikh
*Assistant Examiner* — Peter Chau
(74) *Attorney, Agent, or Firm* — Wilmer Cutler Pickering Hale and Dorr LLP

(57) ABSTRACT

This disclosure relates to a system and method for providing a mechanism control page requests sent in a wireless communication network. The paging control mechanism can be implemented in a gateway through a combination of hardware and software to determine whether packets received at a gateway trigger a page. The packets received at the gateway are intended for user equipment that is indicated to be in an idle state with no bearer connection. The paging mechanism controls paging when paging requests need to be sent. In some communication networks, page requests can be sent that are not needed because a bearer connection or link is in the process of being established. The control can be asserted by adding intelligence to the gateway to determine—on receipt of downlink data or signaling—how to proceed based on the state of the user equipment and the bearer connection.

6 Claims, 6 Drawing Sheets

(56) References Cited

U.S. PATENT DOCUMENTS

| | | | |
|---|---|---|---|
| 2004/0152422 A1 | 8/2004 | Hoglund et al. | |
| 2004/0203825 A1 | 10/2004 | Daniel et al. | |
| 2004/0203894 A1 | 10/2004 | Watanabe et al. | |
| 2004/0205247 A1 | 10/2004 | Ahn | |
| 2005/0003856 A1 | 1/2005 | Jang et al. | |
| 2005/0025116 A1 | 2/2005 | Chen et al. | |
| 2005/0044138 A1 | 2/2005 | Albert et al. | |
| 2005/0083931 A1* | 4/2005 | Blair | 370/389 |
| 2005/0129013 A1 | 6/2005 | Rasanen | |
| 2005/0136884 A1 | 6/2005 | Reidelsturz et al. | |
| 2005/0149754 A1 | 7/2005 | Rasanen | |
| 2005/0159167 A1 | 7/2005 | Hakalin et al. | |
| 2007/0259673 A1 | 11/2007 | Willars et al. | |
| 2008/0130568 A1 | 6/2008 | Gallagher et al. | |
| 2009/0129307 A1 | 5/2009 | Akhtar et al. | |
| 2009/0176513 A1 | 7/2009 | Bosch et al. | |
| 2010/0075698 A1 | 3/2010 | Rune et al. | |
| 2010/0124223 A1 | 5/2010 | Gibbs et al. | |
| 2010/0210288 A1* | 8/2010 | Kim et al. | 455/458 |
| 2010/0220680 A1 | 9/2010 | Ramankutty et al. | |
| 2010/0232393 A1* | 9/2010 | Shuai et al. | 370/331 |
| 2011/0235605 A1* | 9/2011 | Yeoum et al. | 370/329 |
| 2011/0286465 A1 | 11/2011 | Koodli et al. | |
| 2011/0310804 A1* | 12/2011 | Beygzadeh | 370/328 |
| 2012/0039213 A1* | 2/2012 | Cheng et al. | 370/254 |
| 2012/0039304 A1* | 2/2012 | Kim et al. | 370/332 |
| 2012/0044805 A1* | 2/2012 | Lee et al. | 370/230 |
| 2012/0093086 A1* | 4/2012 | Yin et al. | 370/328 |
| 2012/0202491 A1* | 8/2012 | Fox et al. | 455/435.1 |

OTHER PUBLICATIONS

3GPP TS 23.401 v8.3.0 (Sep. 2008), 3rd Generation Partnership Project; Technical Specification Group Services and System Aspects; General Packet Radio Service (GPRS) enhancements for Evolved Universal Terrestrial Radio Access Network (E-UTRAN) access (Release 8), http://www.3gpp.org. 204 pages.

3GPP TS 23.402 v8.3.0 (Sep. 2008), 3rd Generation Partnership Project; Technical Specification Group Services and System Aspects; Architecture enhancements for non-3GPP accesses (Release 8), http://www.3gpp.org. 190 pages.

3GPP TS 29.212 v8.1.0 (Sep. 2008), 3rd Generation Partnership Project; Technical Specification Group Core Network and Terminals; Policy and Charging Control over Gx reference point (Release 8), http://www.3gpp.org. 60 pages.

International Search Report and Written Opinion for International Application No. PCT/US11/37407 mailed Jul. 27, 2011. 15 pages.

Alcatel-Lucent. "NIMTC-MME-SGSN Overload Control by DL MTC Traffic Throttling." 3GPP Draft; S2-102488, Mobile Competence Centre; 650, Route Des Lucioles; F-06921, France. vol. SA WG2, Meeting # 79. Kyoto, Japan. May 10-14, 2010. 2 pages.

Huawei. "IMS Multimedia Priority Services Solution for eMPS." 3GPP Draft; S2-101087, Mobile Competence Centre. Meeting #77. San Francisco, Feb. 22-26, 2010. 4 pages.

Alcatel-Lucent. "MME Overload Control by Throttling of DL Low Priority Traffic." Mobile Competence Centre. Meeting #81. Prague, Czech Republic. Oct. 11-15, 2010. 7 pages.

* cited by examiner

US 8,537,829 B2

PAGING CONTROL IN COMMUNICATION NETWORKS

TECHNICAL FIELD

This disclosure relates to a system and method for providing a mechanism to control page requests sent in a wireless communication network.

BACKGROUND

Wireless networks are telecommunications networks that use radio waves to carry information from one node in the network to one or more receiving nodes in the network. Wired communication can also be used in portions of a wireless network, such as between cells or access points. Cellular telephony is characterized by the use of radio cells that provide radio coverage for a geographic area, with multiple cells arranged to provide contiguous radio coverage over a larger area.

Wireless communication technologies are used in connection with many applications, including, for example, satellite communications systems, portable digital assistants (PDAs), laptop computers, and mobile devices (e.g., cellular telephones, user equipment). One benefit that users of such applications can obtain is the ability to connect to a network (e.g., the Internet) as long as the user is within range of such a wireless communication technology. Current wireless communication systems use either, or a combination of, circuit switching and packet switching in order to provide mobile data services to mobile devices. Mobile devices may not always be ready to communicate as they power down certain features to conserve power. In this case, a special type of messaging, a page, can be used to inform the mobile device that a call is incoming. The mobile device, upon receiving a page, can power up to receive a call or data.

Overview

In certain embodiments a method is disclosed that includes receiving, at a serving gateway, a packet destined for a user equipment after a bearer for sending the packet to the user equipment has been torn down, determining, at the serving gateway, whether the user equipment is capable of receiving the downlink packet when information at the serving gateway indicates the user equipment is currently incapable of receiving the downlink packet, and withholding sending a page notification to a mobility management entity for the downlink packet to initiate the re-establishment of the bearer connection when the serving gateway determines that the bearer connection is already being re-established even though no notification of the re-establishment has been received at the serving gateway.

DESCRIPTION OF EXAMPLE EMBODIMENTS

Systems and methods of providing selective paging in a communication network are disclosed in certain embodiments. A page can be a message sent from a network device, such as a gateway in the communication network in order to begin communications with a mobile device, such as user equipment (UE). Pages are typically sent on a one-way control channel from a network component to a mobile user. Paging can be sent according to a protocol and in a manner that allows a mobile device to conserve power by idling many functions while not in use, and by waking up to listen for a specific paging message before activating. The message, a page, can indicate to the mobile device that a network device has information for the mobile device or desires to begin a session with the mobile device. The page can prompt the mobile device to send a response that results in a radio connection over a traffic channel with a base station in order to receive the information or otherwise have a session with the network. Multiple levels of paging messages can be used; for example, there can be a short page message that causes the mobile device to wake up to receive a longer page message.

When the user equipment is in an idle state, the communication network registers or identifies the user equipment as being in an idle state. When the UE is identified as being in an idle state, page messages are sent to the UE in order to establish a bearer communication. In some communication networks there can be a delay in the propagating a UE's state change through the core network. In an active state, packets and other signaling can be sent directly to the UE without a page because a bearer is established to transmit packets between user equipment and other network devices. The network devices involved in paging a UE can vary depending on the communication network.

Figure 1:
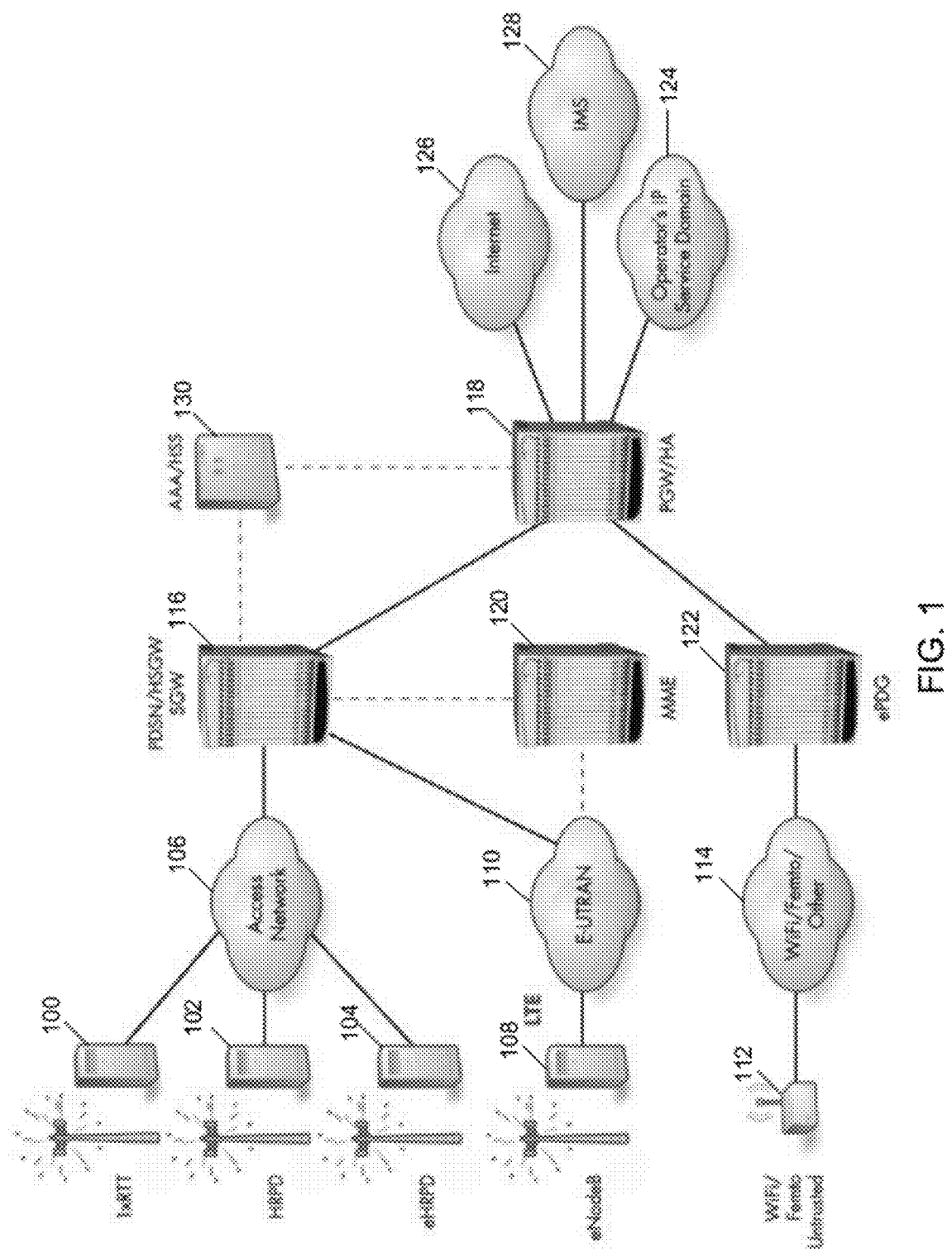
FIGS. 1-2 illustrate communication networks including a long term evolution (LTE) topology in accordance with some embodiments.

FIG. 1 illustrates a communication network that includes a selective paging mechanism in accordance with certain embodiments. FIG. 1 includes a number of radio access technologies such as a 1xRTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies such as WiFi, Femto, WiMAX, or any other radio spectrum technology can use transceiver 112 to connect to the network using a broadband or other access network.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1xRTT 100, the HSGW functionality can be used with HRPD 102 and eHRPD 104, and the SGW functionality can be used with the eNodeB 108. The access gateway 116 can communicate with an anchor gateway 118, and a mobility management entity (MME) 120. The anchor gateway 118 can implement a packet data network gateway (PGW) and a Home Agent (HA). On the access network side, the anchor gateway 118 can also communicate with an evolved packet data gateway (ePDG) 122 which provides connectivity to the WiFi/Femto/other transceiver 112. On the packet core side, the anchor gateway can communicate with the operator's IP service domain 124, the internet 126, and IP multimedia subsystem (IMS) 128. An authentication, authorization, and accounting (AAA) server/home subscriber server (HSS) 130 can communicate with the access gateway 116, the anchor gateway 118, or both.

In FIG. 1, the dashed lines represent primarily control signaling that can include various types of information used in managing and maintaining a call session with a user equipment. Correspondingly, the solid lines indicate primarily user data traffic, which includes data packets with content such as email, images, video, etc. Control signaling may be sent over the solid lines as well between network devices. The network devices can be connected for the purposes of communication using any type of applicable data link such as copper based, optical fiber, wireless airlink, or any other type of medium.

The HSS can be a master user database that supports IMS network entities that handle calls. The AAA/HSS 130 stores subscription-related information (subscriber profiles), performs authentication and authorization of the user, and can provide information about the subscriber's location and IP information. The AAA/HSS server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In certain embodiments, the AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communications network includes the MME 120, SGW 116 and PGW 118 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state UEs, the SGW terminates the down link data path and triggers paging when down link data arrives for an idle UE. The SGW manages and stores UE contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1X and EVDO).

The MME resides in the EPC control plane and manages session states, authentication, paging, mobility with 3GPP 2G/3G nodes, roaming, and other bearer management functions. The MME can be a standalone element or integrated with other EPC elements, including the SGW, PGW, and Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 120 is a control-node for the LTE access network. The MME is responsible for UE tracking and paging procedures including retransmissions. MME 120 handles the bearer activation/deactivation process and is also responsible for choosing the SGW for a UE at the initial attach and at time of an intra-LTE handover. The MME also authenticates the user by interacting with the HSS 130. The MME also generates and allocates temporary identities to UEs and terminates Non-Access Stratum (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN (not shown). The MME also terminates the S6a interface towards the home HSS for roaming UEs.

The ePDG 122 is responsible for interworking between the EPC and fixed non-3GPP access technologies such as a WiFi, WiMAX, LTE metro, and femtocell access networks. The ePDG 122 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
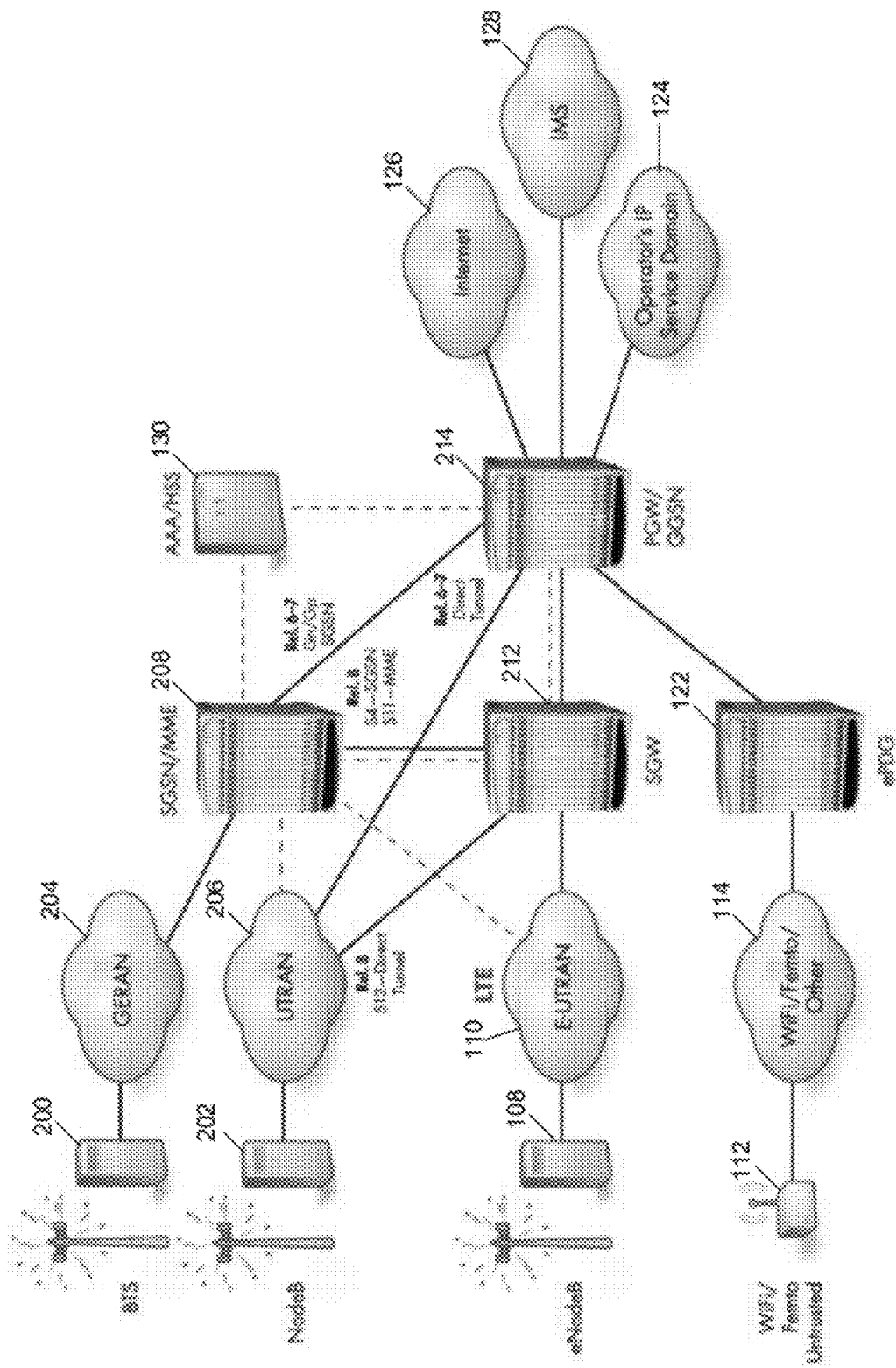

FIG. 2 illustrates a communication network that implements a selective paging mechanism with legacy universal mobile telecommunications systems (UMTS) network devices in accordance with certain embodiments. The legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214.

In some embodiments, the selective paging mechanism can be implemented on a gateway, such as PDSN/HSGW/SGW 116. The gateway 116 can access and maintain information relating to the communication session, the subscriber, the radio bearers, and the policies relating to the communication session. The gateway 116 may be used to provide various services to a mobile device and implement the quality of service (QoS) on packet flows. Several of these functions are used in providing, for example, voice over IP (VoIP) routing and enhanced services, such as enhanced charging, stateful firewalls, traffic performance optimization (TPO). The communication networks also allow provision of applications such as VoIP, streaming video, streaming music, multi-user gaming, location based services, and a variety of content delivered to a mobile node. Residing within the gateway can be one or more network processing units, line cards, as well as packet and voice processing cards.

As mentioned above, the user equipment (UE) may be in an active state or an idle state. Whether the UE is in an active state can depend on the state of a packet data session, and whether there is an active packet data session. The idle state includes a sleep mode state that can be used to conserve battery life of user equipment by minimizing the need to power receivers to be ready for radio signals. The idle state may also include the time that the UE periodically wakes up to listen for a page and the time the UE receives a page. In these instances, the UE is not sleeping, but it is not considered to be in an active state. The paging indicators can be received from one cell, but are usually broadcast from a number of cells because user equipment may move while in an idle state. For user equipment in an idle state, the SGW can buffer IP packets received for the user equipment and can initiate page requests towards the MME or SGSN. If the user equipment responds to the page, the SGW forwards the IP packet to the eNB in a LTE network or to a RNC/NB or RNC/BS in UMTS/general packet radio service (GPRS) for delivery to the user equipment.

In the LTE communication network, typically the SGW pages the MME when downlink data arrives from the PDN-GW and the UE is in idle state (e.g., ECM-Idle). The MME can, in turn, page the UE so the downlink data can be sent to the UE. The MME re-establishes the EPS bearers when the UE responds to this paging. EPS is effectively a connection-oriented transmission network that establishes a "virtual" connection between two endpoints (e.g., the UE and the PDN-GW) before any traffic is sent between them. This virtual connection is called an EPS Bearer, which emphasizes that the virtual connection provides a bearer service, i.e. a transport service with specific QoS attributes.

In some embodiments, due to delay in propagation of information, the UE may already be transitioning or have transitioned to an active state, yet the SGW is not aware of this transition. In such cases, the triggering of a page at the SGW can unnecessarily use system resources. The situation can be exacerbated because the LTE core network allows uplink data to start before the Idle-Active transition is propagated throughout the entire core network (e.g., to the SGW). This uplink data can trigger downlink data back to the UE before the new state of the UE has been registered throughout the LTE core network. In such cases, any downlink data in response to this uplink data can cause paging signaling towards the MME and thus add to the processing load at the MME.

In some embodiments, a mechanism and method is provided to reduce the paging and signaling from a gateway towards the UE that is due to propagation delays of state information. This can include adding a logic to the SGW to avoid paging for certain downlink packets by examining the per-UE context stored in the SGW and determining if the MME is in the midst of setting up the S1U tunnels. This logic can be implemented in a combination of software and hardware. For example, a processor running software code can analyze activity history and inspect the paging packet to make a determination before paging the MME or any other network device. The activity history can include the uplink activity history of the UE to determine whether the UE has sent uplink packets before the bearers have been re-established to provide a communication link with the UE. For example, if a UE has an application or other program that initiates sending uplink packets, which causes downlink packets to be received at the SGW prior to notification of a state change, this information can be obtained from the uplink activity history. The SGW can also perform an inspection of the packet such as shallow packet inspection (SPI), which can be an inspection involving the packet header, while deep packet inspection (DPI) involves inspecting the packet payload or perhaps packet headers that are encapsulated in the payload of the packet.

The inspection of the packet can include looking into the content of the downlink packet to determine whether the packet is in response to an uplink packet sent from a UE triggered service request. After determining whether the downlink packet is responsive to an uplink packet, a determination can be made as to whether the packet triggers a paging response. For example, the SGW can avoid paging a UE for downlink packets, when the MME is in midst of re-establishing the S1 bearers.

Operation of Selective Paging Mechanism

There are various scenarios where a downlink packet arrives at a network device before a connection is setup to a UE. In some situations, a connection may be in the process of being setup to allow communication with the UE without having to send a page to the UE. In one scenario, a UE transitions to an idle state due to inactivity, which prompts the S1 connection between the MME and UE to be torn down and the MME and SGW release all eNodeB related information. After this occurs, the SGW still retains the SGW S1-U configuration (self address and TEIDs) allocated to the bearer contexts of that UE. As part of S1 re-establishment, the UE, and the corresponding eNodeB that provides an airlink connection to the UE, can send uplink data to SGW before the MME's message (Modify Bearer Request) reaches the SGW. The UE can therefore initiate uplink packet transmission in the communication network and the SGW can receive downlink packets in response to these uplink packets before the S1 bearer re-establishment is complete, or before the SGW receives notification of the S1 re-establishment.

Figure 3:
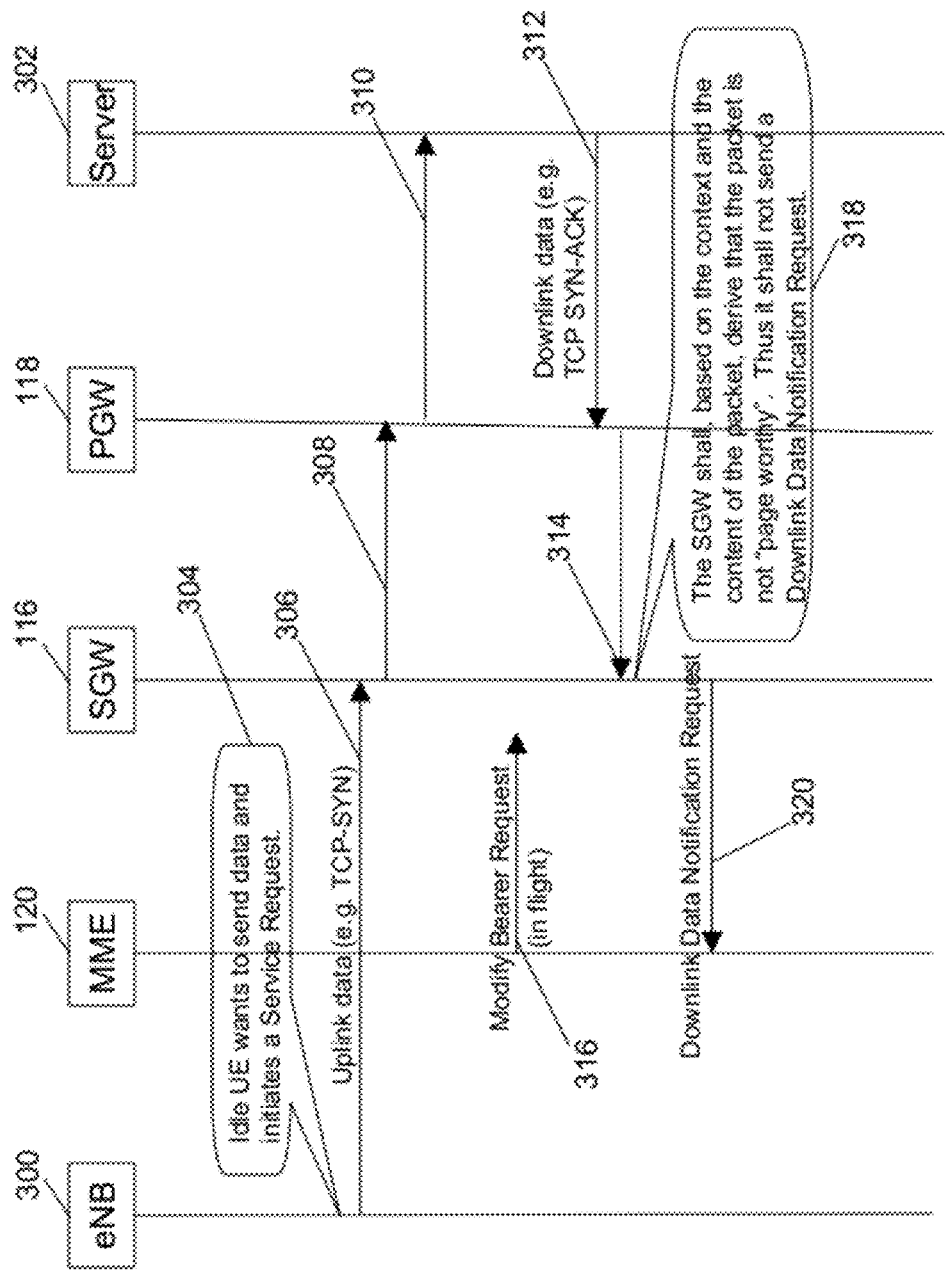
FIG. 3 illustrates a signaling diagram where the selective paging mechanism prevents the sending of an unnecessary page in accordance with certain embodiments.

FIG. 3 illustrates a signaling diagram where the selective paging mechanism prevents the sending of an unnecessary page in accordance with certain embodiments. FIG. 3 includes an eNodeB (eNB) 300, a MME 120, a SGW 116, a PGW 118, and a server 302. In 304, a UE wants to send data and initiates a service request with the appropriate eNB 300. The eNB 300 sends uplink data 306 to SGW 116. The SGW 116 uses the stored S1-U configuration information for the UE to send uplink data 308 to PGW 118. PGW 118 sends uplink data 310 onto the appropriate server 302 that can fulfill the request. The uplink data can be, for example, a TCP SYN (synchronization packet) from UE prompting a TCP SYN-ACK (synchronization acknowledgement), or a DNS (domain name server) query causing a DNS response. Server 302 sends downlink data 312 to PGW 118 in response to the uplink data 310. PGW 118 sends downlink data 314 to SGW 116. SGW 116 is not aware of any S1 bearer being established with the UE, due to delay or other circumstances, and so SGW 116 has not received a modify bearer request message 316 from MME 120. Thus, from the information stored at the SGW 116, the SGW is not aware of the UE's transition to an active state or that any bearers are being setup to allow downlink communication with the UE.

If such downlink packet/response arrives at the SGW 116 before the S1 bearer is setup, i.e., before the modify bearer request 316 from MME 120 is received by the SGW 116, the SGW pages the UE by sending a downlink data notification request 320 to the MME 120. This paging provides little value since the MME 120 is already in the process of setting up the S1 bearer and may have already sent the modify bearer request to the SGW. However, such paging requests add load to the signaling link between the MME 120 and SGW 116 and more importantly place additional processing load at the MME. Various applications on the UE can wake up periodically for some activity like check-for-upgrade, refresh-list, and update information, for example. This application activity can then trigger the sending of uplink packets from the UE to the network before bearers are setup. In addition, communication networks will increasingly handle "always on" UEs or smart phones. For networks with large number of fixed devices using LTE access (e.g., sensors), this may cause a problem as well.

In 318, the SGW can determine whether a packet triggers a page by checking the context and the content of the packet. If a determination is made that a packet is not page worthy, then no page or a downlink data notification request is sent from the SGW 116 and the packet(s) can be buffered. In some embodiments, to make this determination the SGW determines:

(1) if the UE is sending a UE initiated service request, which can be determined based on per-UE internal state stored at the SGW, including S1-U state and last activity time, and (2) if the SGW has forwarded any uplink packet(s) from the UE in the past 'n' milliseconds, where 'n' is configurable based on the observed delay between the uplink data and MME initiated S1 bearer setup. The SGW can provide this value by measuring and exporting average delay on a continuous basis.

Optionally, the SGW can determine if the downlink packet is in response to (one of the) uplink packet(s) it recently sent. In some embodiments, the SGW can match the downlink packet to a per-UE filter cache(s) that it maintains to make this determination. This cache includes filters based on the uplink packet(s) sent by the UE in past the 'n' milliseconds. In some embodiments based on UDP and TCP port filters, the SGW can determine if the downlink TCP packet is in response to an uplink TCP packet or whether a DNS Response is a response to a DNS request. This SGW response matching can increase the accuracy in making a determination about whether to send a page. The matching process can also be sped up at the SGW by employing various mechanisms, for example, lookup only in relevant filters on a per-PDN basis.

In some embodiments, the gateway can determine when the UE initiates an initial attach procedure and use this information to trigger selective paging. This paging can arise when the UE initiates an attach procedure and the UE has requested a dynamic IPv6 address allocation. In order to provide the address allocation, the downlink data involved in the initial attach procedure includes the IP address setup information. As part of the address allocation the PGW sends an unsolicited router advertisement, which is part of the IPv6 Stateless Address auto-configuration. Selective paging at the gateway can be useful in this instance because the bearer may not be setup to allow the router advertisement to pass to the UE. Given this possibility, the gateway selective paging mechanism can used to avoid paging for such data.

In some embodiments, the selective paging mechanism can be used in tracking area updates. The selective paging mechanism at the gateway, such as the SGW, can determine if the UE is in midst of a GERAN to eUTRAN Gn/Gp SGSN to MME tracking area update. It can do this based by examining the initial create session request message. For certain applications and networks, this can cause downlink data or signaling to arrive at the SGW even though the MME could be in process of setting up the bearers. The selective paging mechanism can be used to avoid paging for such data/signaling.

Selective paging may also be provided at the MME. For example, if the MME receives a paging request while it is in the midst of setting up the bearer on the SGW, it ignores the message from the SGW and does not send the S1 paging messages. However, by doing this the paging request has already used up processing cycles on the MME. Additionally, the MME may, upon detecting that the rate of ignored messages is high, initiate a delay at the SGW to hold messages across UEs by a certain time so that the SGW can receive notification regarding bearer setup and avoid paging the MME. However, this may not be desirable in some embodiments because high priority data like IMS signaling may be delayed, which can affect user experience. Alternatively, the SGW can delay sending certain page requests and perform a filtering or other inspection on the packet to determine a priority of the packet and use this information to determine how to handle the packet.

Figure 4:
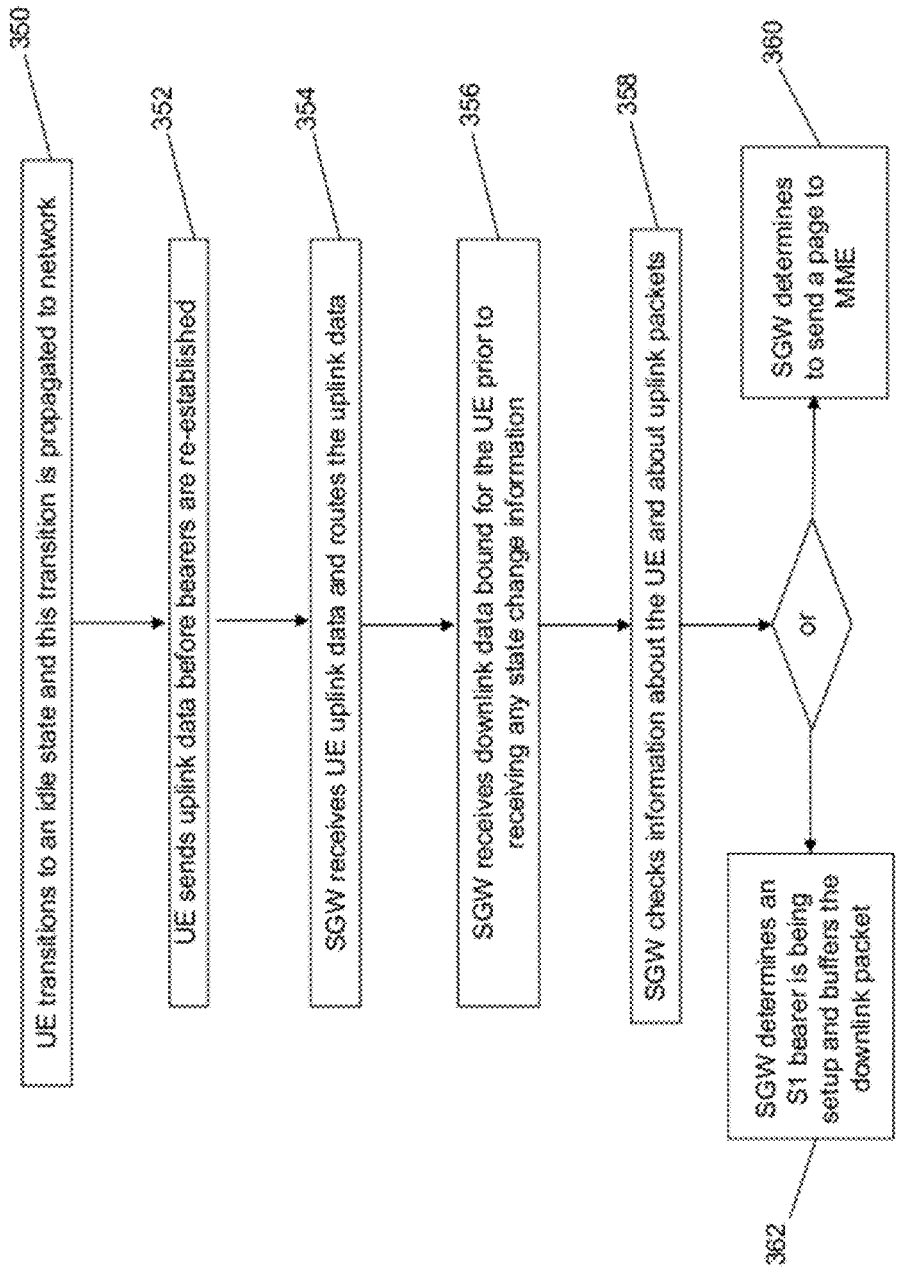
FIG. 4 illustrates a flow diagram of a selective paging mechanism in accordance with certain embodiments.

FIG. 4 illustrates a flow diagram of a selective paging mechanism in accordance with certain embodiments. In step 350, the UE transitions to an idle state and this transition is propagated to the communication network. The connection to the UE is torn down and information about the radio access network is released. In 352, the UE sends uplink data to the SGW before the S1 bearers are re-established. Until the S1 bearers have been re-established and the update notification has been propagated through the communication network, network devices such as the SGW are inclined to page the UE when a packet is received. In 354, the SGW receives the UE uplink data and routes the uplink data in the communication network on to the destination, such as a server. The destination can respond with downlink packets for the UE, which are received at the SGW in 356. These downlink packets can be received before the SGW receives any state change information for the UE or before receiving a modify bearer request message indicating that the bearers have been established.

In 358, the SGW checks information about the UE and about uplink packets. This can include checking if the UE has forwarded any service request messages, if the SGW has forwarded a packet from the UE within a certain of window of time. Based on the results of the checking in 358, the SGW determines to send a page to the MME in 360 or the SGW determines an S1 bearer is being setup and buffers the downlink packet in 362. In 362, the SGW is able to determine that the MME is in midst of setting up the S1 bearers and hence the SGW can avoid sending Downlink Data Notification to the MME. It can buffer the packet and send it towards the eNB once the S1-bearers are setup. If the SGW determines to send a page in 360, the SGW can proceed with a network triggered service request with a downlink data notification request message.

User Equipment and Gateway

The user equipment described above can communicate with a plurality of radio access networks using a plurality of access technologies and with wired communication networks. The user equipment can be a smartphone offering advanced capabilities such as word processing, web browsing, gaming, e-book capabilities, an operating system, and a full keyboard. The user equipment may run an operating system such as Symbian OS, iPhone OS, RIM's Blackberry, Windows Mobile, Linux, Palm WebOS, and Android. The screen may be a touch screen that can be used to input data to the mobile device and the screen can be used instead of the full keyboard. The user equipment may have the capability to run applications or communicate with applications that are provided by servers in the communication network. The user equipment can receive updates and other information from these applications on the network.

The user equipment also encompasses many other devices such as televisions (TVs), video projectors, set-top boxes or set-top units, digital video recorders (DVR), computers, netbooks, laptops, and any other audio/visual equipment that can communicate with a network. The user equipment can also keep global positioning coordinates, profile information, or other location information in its stack or memory. The user equipment can have a memory such as a computer readable medium, flash memory, a magnetic disk drive, an optical drive, a programmable read-only memory (PROM), and/or a read-only memory (ROM). The user equipment can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The user equipment can also provide a variety of user interfaces such as a keyboard, a touch screen, a trackball, a touch pad, and/or a mouse. The user equipment may also include speakers and a display device in some embodiments.

The gateway described above is implemented in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (AS-NGW), a User Plane Entity (UPE), an IP Gateway, a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA). In certain embodiments, the functionalities are provided by a combination of hardware and software in the network device. General purpose hardware can be configured in the network device to provide one or more of these specialized functionalities.

Figure 5:
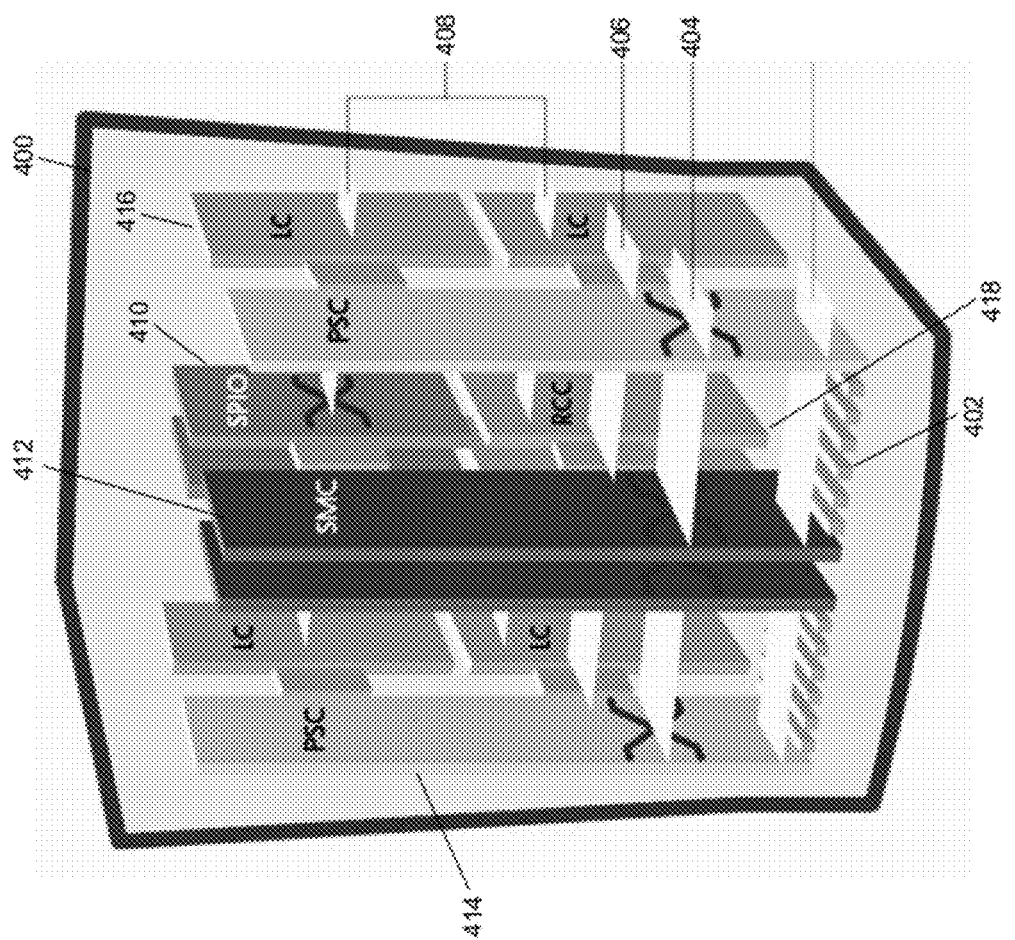
FIGS. 5-6 illustrate a network device in accordance with certain embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 5 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 6:
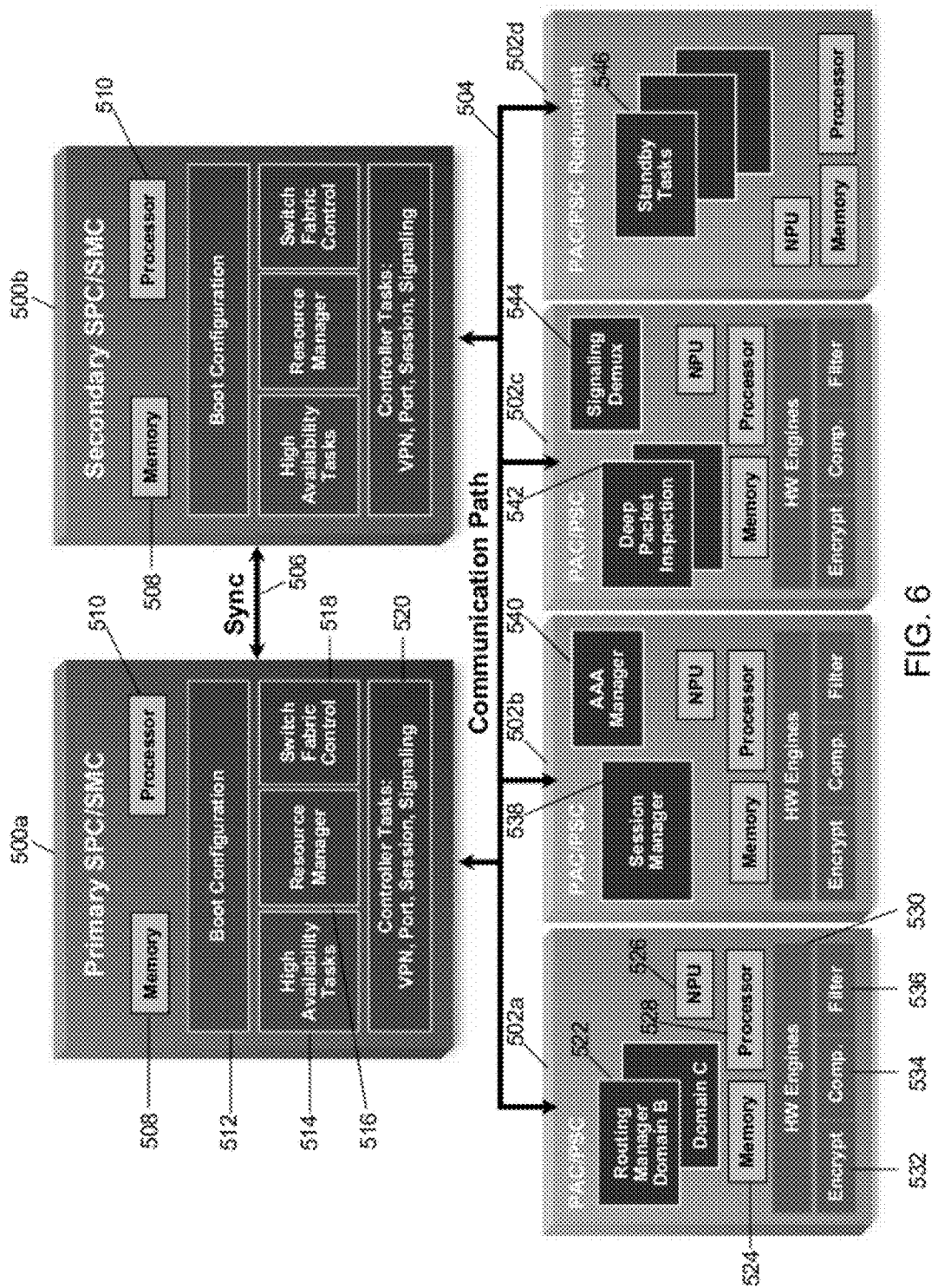

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 6 illustrates a logical view of the software architecture of a network device in accordance with certain embodiments. As shown, the software and hardware can be distributed within the network device and across different circuit boards, processors, and memory. FIG. 6 includes a primary switch processor card (SPC)/system management card (SMC) 500*a*, a secondary SPC/SMC 500*b*, PAC/PSC 502*a*-502*d*, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manage and control the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for user equipment.

The PAC/PSC 502 are high-speed processing cards that are designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 are also capable of running a variety of tasks or modules. PAC/PSC 502a provides routing managers 522 with each covering routing of a different domain. PAC/PSC 502b provides a session manager 538 and an AAA manager 540. The session manager 538 manages one or more sessions that correspond to one or more user equipment. A session allows a user equipment to communicate with the network for voice calls and data. The AAA manager 540 manages accounting, authentication, and authorization with an AAA server in the network. PAC/PSC 502 provides a deep packet inspection task 542 and a signaling demux 544. The deep packet inspection task 542 provides inspection of packet information beyond layer 4 for use and analysis by the network device. The signaling demux 544 can provide scalability of services in combination with other modules. PAC/PSC 502d provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims. For example, LTE functionality such as a PDN gateway can be combined or co-located with the MME.

I claim:

1. A serving gateway comprising:
    an interface for communicating with a user equipment, wherein a serving gateway receives packets from and transmits packets to the user equipment with the interface;
    a computer readable medium that is configured to buffer at least one data packet; and
    a processing unit configured to:
        determine whether a previously established bearer connection is being re-established with the user equipment prior to receiving a notification at the serving gateway that the user equipment is capable of receiving a downlink packet;
        upon making a determination that the bearer connection is being re-established, initiate sending a downlink packet destined for the user equipment to the computer readable medium until a bearer connection is re-established with the user equipment;
        check whether the downlink packet is received in response to an uplink data packet sent by the user equipment before the bearer connection is re-established; and
        check, based on whether the uplink packet was received at the serving gateway, a configurable amount of time before the downlink packet was received at the serving gateway, wherein the configurable amount of time is based on an amount of time to re-establish a bearer connection with the user equipment.

2. The serving gateway of claim 1, further comprising a filter cache for caching information from packets that meet certain specified criteria, and wherein the processing unit checks based matching the downlink packet to at least one filter cache on the serving gateway for the user equipment.

3. The serving gateway of claim 1, wherein the processing unit initiates sending a page to a mobility management entity when the processing unit determines that no bearer connection is being re-established with the user equipment.

4. The serving gateway of claim 1, wherein the interface communicates with a femto transceiver and selective paging is used to control messaging to a femto network.

5. A method comprising:
    determining, at a serving gateway, whether a previously established bearer connection is being re-establish with a user equipment (UE) prior to receiving a notification at the serving gateway from a mobility management entity (MME) that the UE is able to receive a downlink packet;
    upon making a determination that the bearer connection is being re-established, initiate, at the serving gateway, buffering a downlink packet destined for the UE until a bearer connection is re-established with the UE;
    determining, at the serving gateway, whether the downlink packet is received in response to an uplink data packet sent by the UE before the bearer connection is re-established; and
    determining, at the serving gateway and based on whether the uplink packet was received at the serving gateway, a configurable amount of time before the downlink packet was received at the serving gateway, wherein the configurable amount of time is based on an amount of time to re-establish a bearer connection with the UE.

6. The method of claim 5, further comprising:
if it is determined at the serving gateway that no bearer connection is being re-established with the UE, sending a page to the MME from the serving gateway.

* * * * *